United States Patent [19]

Patel et al.

[11] Patent Number: 5,705,974
[45] Date of Patent: Jan. 6, 1998

[54] POWER LINE COMMUNICATIONS SYSTEM AND COUPLING CIRCUIT FOR POWER LINE COMMUNICATIONS SYSTEM

[75] Inventors: Chandrakant Bhailalbhai Patel, Hopewell; Jack Rudy Harford, Flemington, both of N.J.; Henry Charles Klein, West Chester; Edward Alan Wald, Bensalem, both of Pa.

[73] Assignee: Elcom Technologies Corporation, Malvern, Pa.

[21] Appl. No.: 438,178

[22] Filed: May 9, 1995

[51] Int. Cl.$^6$ ............................................. H04M 11/04
[52] U.S. Cl. ........................ 340/310.08; 340/310.07; 340/310.05; 340/310.01; 333/32
[58] Field of Search .................. 340/310.01, 310.03, 340/310.05, 310.07, 310.08; 333/24, 32

[56] References Cited

U.S. PATENT DOCUMENTS

| | | | |
|---|---|---|---|
| 3,609,241 | 9/1971 | Ricthmeier | 379/100 |
| 3,846,638 | 11/1974 | Wetherell | 340/310.05 |
| 3,909,821 | 9/1975 | Jagoda et al. | 340/310.05 |
| 3,917,916 | 11/1975 | Ghosh et al. | 340/825.07 |
| 3,925,728 | 12/1975 | Whyte | 340/310.05 |
| 4,277,978 | 7/1981 | Puckette | 73/632 |
| 4,646,319 | 2/1987 | Engel et al. | 375/7 |
| 4,745,391 | 5/1988 | Gajjar | 340/310.07 |
| 4,847,903 | 7/1989 | Schotz | 381/3 |
| 4,973,940 | 11/1990 | Sakai et al. | 340/310.07 |
| 4,980,665 | 12/1990 | Schotz | 340/310.07 |
| 5,210,519 | 5/1993 | Moore | 340/310.07 |
| 5,455,467 | 10/1995 | Young et al. | 340/310.07 |

FOREIGN PATENT DOCUMENTS

| | | |
|---|---|---|
| 0 463 341 | 1/1992 | European Pat. Off. |
| WO 90/13950 | 11/1990 | WIPO |

OTHER PUBLICATIONS

Copy/European Search Report.

*Primary Examiner*—Thomas Mullen
*Assistant Examiner*—Ashok Mannava
*Attorney, Agent, or Firm*—Ratner & Prestia

[57] ABSTRACT

A coupling circuit for a power line communications system for coupling information signals from a transmitter unit to a power line and for coupling information signals from the power line to a receiver unit. The coupling circuit includes: (a) a ferrite core coupler for isolating the transmitter unit or the receiver unit from a power line and for coupling information signals from the transmitter unit to the power line and from the power line to the receiver unit, (b) a bandpass filter for selectively passing information signals from the transmitter unit to thew power line and from the power line to the receiver unit, and (c) an impedance matching pad for matching the impedance of the transmitter unit to the impedance at an outlet connected to the power line and to which the transmitter unit is connected and the receiver unit to the impedance at an outlet connected to the power line and to which the receiver unit is connected.

8 Claims, 1 Drawing Sheet

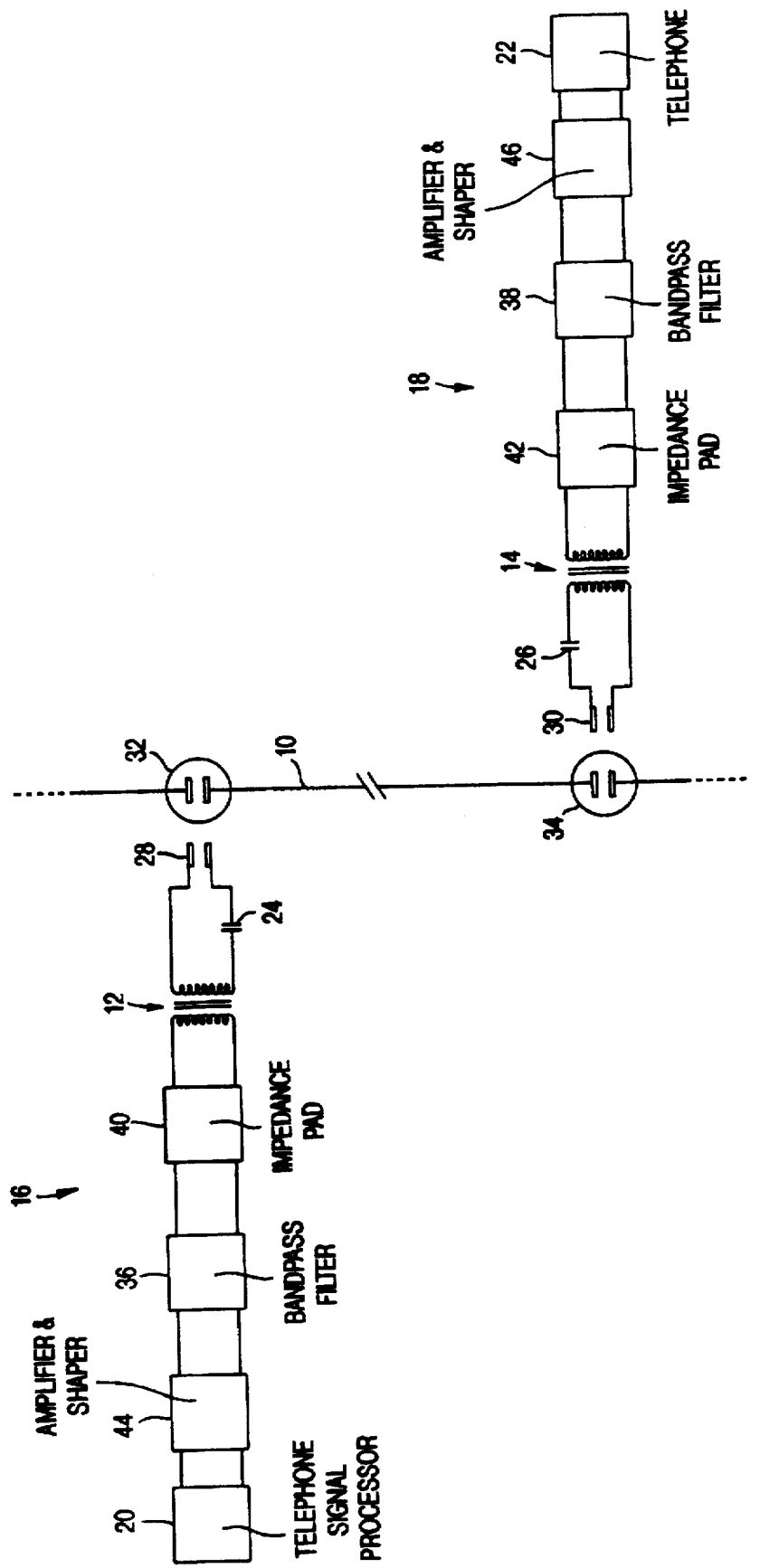

POWER LINE COMMUNICATIONS SYSTEM AND COUPLING CIRCUIT FOR POWER LINE COMMUNICATIONS SYSTEM

TECHNICAL FIELD

The present invention relates, in general, to the communication of information along power lines and, in particular, to coupling circuitry by which a source of information signals or a utilization unit is connected to a power line.

BACKGROUND OF THE INVENTION

The lines by which power is distributed in a building can be and are used for the transmission of information signals between rooms within a building. A very important component in a power line communications system is the coupling circuitry by which a source of information signals (e.g. a telephone line or a cable television connection box which supplies cable television signals) is connected to the power line or a utilization unit (e.g. a telephone extension or a television set) is connected to the power line. The coupling circuitry is intended to provide isolation from the power line, impedance matching to the power line, and required filtering of signals transmitted and received along the power line to pass the desired signal for necessary processing.

Generally, coupling circuitry of this type, which is known today, provides inadequate selectivity and impedance matching. One known type includes a unified coupler. A major shortcoming of a unified coupler is the inability to balance the required function and performance of the coupler. A compromise is made to match impedance to retain the filter frequency response characteristic over the expected power line impedance variations. Such design requirements severely limit usage of unified couplers.

Generally, a unified coupler has primary and secondary windings for coupling signals between the power line and the transmitter unit or the receiver unit. The windings are designed to provide impedance matching as well as frequency selectivity. To provide possible low power impedance matching, special wiring material is used which has resistivity. The length of the wire forming the coil is selected for the required inductance and a coupling capacitor is selected to provide the desired frequency response characteristic. Thus, with a unified coupler, the parameters controlling the frequency response characteristic are wire resistance, the inductance of the wire and the capacitor. This, in itself, indicates the limitation of a unified coupler. Specifically, with only one set of parameters, namely R, L and C, the required bandwidth of desired in-band frequencies and rejection of out-of-band frequencies is drastically limited by the Q of the tuned circuit. Impedance matching is also limited for desired signal transfer. The coupling capacitor, being part of the band shaping, must be selected to provide a specific value as well as to provide AC coupling to the power line.

SUMMARY OF THE INVENTION

In accordance with the present invention, a coupling circuit for a power line communications system for coupling information signals to and from a power line includes a ferrite core coupler for isolating at least one of a transmitter unit from the power line and a receiver unit from the power line and coupling at least one of information signals from the transmitter unit to the power line and information signals from the power line to the receiver unit. This coupling circuit also includes a bandpass filter for selectively passing at least one of information signals from the transmitter unit to the power line and information signals from the power line to the receiver unit. This coupling circuit further includes an impedance matching pad for minimizing mismatches between at least one of the impedance of the band pass filter of the transmitter unit and the impedance at an outlet connected to the power line and to which the transmitter unit is connected and the impedance of the bandpass filter of the receiver unit and the impedance at an outlet connected to the power line and to which the receiver unit is connected.

BRIEF DESCRIPTION OF THE DRAWING

The single FIGURE is a diagram of a power line communications system in which a coupling circuit, constructed in accordance with the present invention, is incorporated.

DETAILED DESCRIPTION OF THE INVENTION

Referring to the drawing, a coupling circuit for a power line communications system for coupling information signals to and from a power line 10, constructed in accordance with the present invention, includes a ferrite core coupler 12 or 14 for isolating at least one of a transmitter unit 16 (i.e. coupler 12) from the power line and a receiver unit 18 (i.e. coupler 14) from the power line. Ferrite couplers 12 and 14 also couple information signals from transmitter unit 16 (i.e. coupler 12) to power line 10 and from power line 10 to receiver unit 18 (i.e. coupler 14).

Ferrite core couplers 12 and 14 function as signal transformers. They are preferably arranged to exhibit a sharp roll off below a frequency of 1 MHz, thereby attenuating interference from 60 Hz and harmonics of 60 Hz. The ferrite material is selected for the frequency range of operation, namely the nature and character of the information signals. For example, the information signals can be processed telephone signals supplied by a telephone signal processor 20, by which telephone signals are delivered to a building, and conducted to a telephone 22. In addition, the present invention can handle audio, television, local area network, and control information signals.

The design parameters of ferrite core couplers 12 and 14 include the size and material of the bead or core and the number of turns. Usually, a bifilar wire is used, thereby providing close coupling between the input and the output. Capacitors 24 and 26 and plugs 28 and 30 connect couplers 12 and 14, respectively, to power line 10 by way of outlets 32 and 34, respectively, which are connected to the power line.

A coupling circuit for a power line communications system, constructed in accordance with the present invention, also includes a band pass filter 36 or 38 for selectively passing at least one of information signals from transmitter unit 16 (i.e. filter 36) to power line 10 and information signals from power line 10 to receiver unit 18 (i.e. filter 38). Bandpass filters 36 and 38 are designed to provide minimal distortion at the frequencies of interest and attenuate out-of-band noise and interference to and from the transmitter unit and the receiver unit. Specific traps also can be designed to reject known interfering signals to improve system performance.

A coupling circuit for a power line communications system, constructed in accordance with the present invention, further includes an impedance matching pad 40 or 42 for minimizing mismatches between at least one of the impedance of bandpass filter 36 of transmitter unit 16 (i.e. impedance pad 40) and the impedance at outlet 32 connected to power line 10 and to which transmitter unit 16 is connected and the impedance of bandpass filter 38 of receiver unit 18 (i.e. impedance pad 42) and the impedance at outlet 34 connected to power line 10 and to which the receiver unit 18 is connected. A power line, for example from outlet 32 to outlet 34, presents different loads at different times in a power line communications system. Impedance pads 40 and 42, respectively, placed between coupler 12 and bandpass filter 36 and between coupler 14 and bandpass filter 38, alleviate the effect of wide variations of impedance mismatches between power line 10 and bandpass filters 36 and 38, while retaining the frequency response characteristics of bandpass filters 36 and 38.

Transmitter unit 16 preferably includes amplifier and shaper means 44, disposed between telephone signal processor 20 and bandpass filter 36, for amplifying and shaping the information signals supplied to transmitter unit 16 from telephone signal processor 20. Likewise, receiver unit 18 preferably includes amplifier and shaper means 46, disposed between bandpass filter 38 and telephone 22, for amplifying and shaping the information signals supplied by receiver unit 16 to telephone 22.

Coupler 12, bandpass filter 36, and impedance pad 40 and coupler 14, bandpass filter 38, and impedance pad 42 form coupling circuits which allow the selection of a desired band of frequencies for signal transmission and reception to the desired degree of selectivity for a given application. For example, in telephone signal transmissions, the signal bandwidth is less than 25 KHz, while in television signal transmissions the signal bandwidth is at least 6 MHz.

While in the foregoing there have been described preferred embodiments of the present invention, it should be understood by those skilled in the art that various modifications and changes can be made without departing from the true spirit and scope of the present invention.

What is claimed:

1. A coupling circuit for a power line communications system for coupling information signals to and from a power line, said coupling circuit comprising:
   a ferrite core coupler for:
   (1) isolating at least one of:
      (a) a transmitter unit from the power line, and
      (b) a receiver unit from the power line, and
   (2) coupling at least one of:
      (a) information signals from the transmitter unit to the power line, and
      (b) information signals from the power line to the receiver unit;
   a bandpass filter for selectively passing at least one of:
   (1) information signals from the transmitter unit to the power line, and
   (2) information signals from the power line to the receiver unit; and
   an impedance matching pad for minimizing mismatches between at least one of:
   (1) the impedance of said bandpass filter of the transmitter unit and the impedance at an outlet connected to the power line and to which the transmitter unit is connected, and
   (2) the impedance of said bandpass filter of the receiver unit and the impedance at an outlet connected to the power line and to which the receiver unit is connected.

2. A coupling circuit according to claim 1 further including amplifier and shaper means for amplifying and shaping at least one of:
   (a) information signals supplied to the transmitter unit, and
   (b) information signals supplied by the receiver unit.

3. A power line communications system comprising:
   a power line;
   a plurality of outlets individually connected to said power line;
   a transmitter unit including:
   (1) a first ferrite core coupler for:
      (a) isolating said transmitter unit from said power line, and
      (b) coupling information signals from said transmitter unit to said power line,
   (2) a first bandpass filter for selectively passing information signals from said transmitter unit to said power line, and
   (3) a first impedance matching pad for minimizing mismatches between said first bandpass filter and the impedance at an outlet connected to the power line and to which said transmitter unit is connected; and
   a receiver unit including:
   (1) a second ferrite core coupler for:
      (a) isolating said receiver unit from said power line, and
      (b) coupling information signals from said power line to said receiver unit,
   (2) a second bandpass filter for selectively passing information signals from said power line to said receiver unit, and
   (3) a second impedance matching pad for minimizing mismatches between the impedance of said second bandpass filter and the impedance at an outlet connected to the power line and to which said receiver unit is connected.

4. A power line communications system according to claim 3 wherein:
   (a) said transmitter unit further includes first amplifier and shaper means for amplifying and shaping information signals supplied to said transmitter unit, and
   (b) said receiver unit further includes second amplifier and shaper means for amplifying and shaping information signals supplied by said receiver unit.

5. A transmitter unit for a power line communications system comprising:
   a ferrite core coupler for:
   (1) isolating the transmitter unit from a power line, and
   (2) coupling information signals from the transmitter unit to the power line;
   a first bandpass filter for selectively passing information signals from the transmitter unit to the power line; and
   an impedance matching pad for minimizing mismatches between said bandpass filter and the impedance at an outlet connected to the power line and to which the transmitter unit is connected.

6. A transmitter unit according to claim 5 further including amplifier and shaper means for amplifying and shaping information signals supplied to the transmitter unit.

7. A receiver unit for a power line communications system comprising:
   a ferrite core coupler for:

(1) isolating the receiver unit from a power line, and
(2) coupling information signals from the power line to the receiver unit;

a bandpass filter for selectively passing information signals from the power line to the receiver unit; and an impedance matching pad for minimizing mismatches between the impedance of said bandpass filter and the impedance at an outlet connected to the power line and to which the receiver unit is connected.

8. A receiver unit according to claim 7 further including amplifier and shaper means for amplifying and shaping information signals supplied by receiver unit.

* * * * *